Patented Feb. 12, 1935

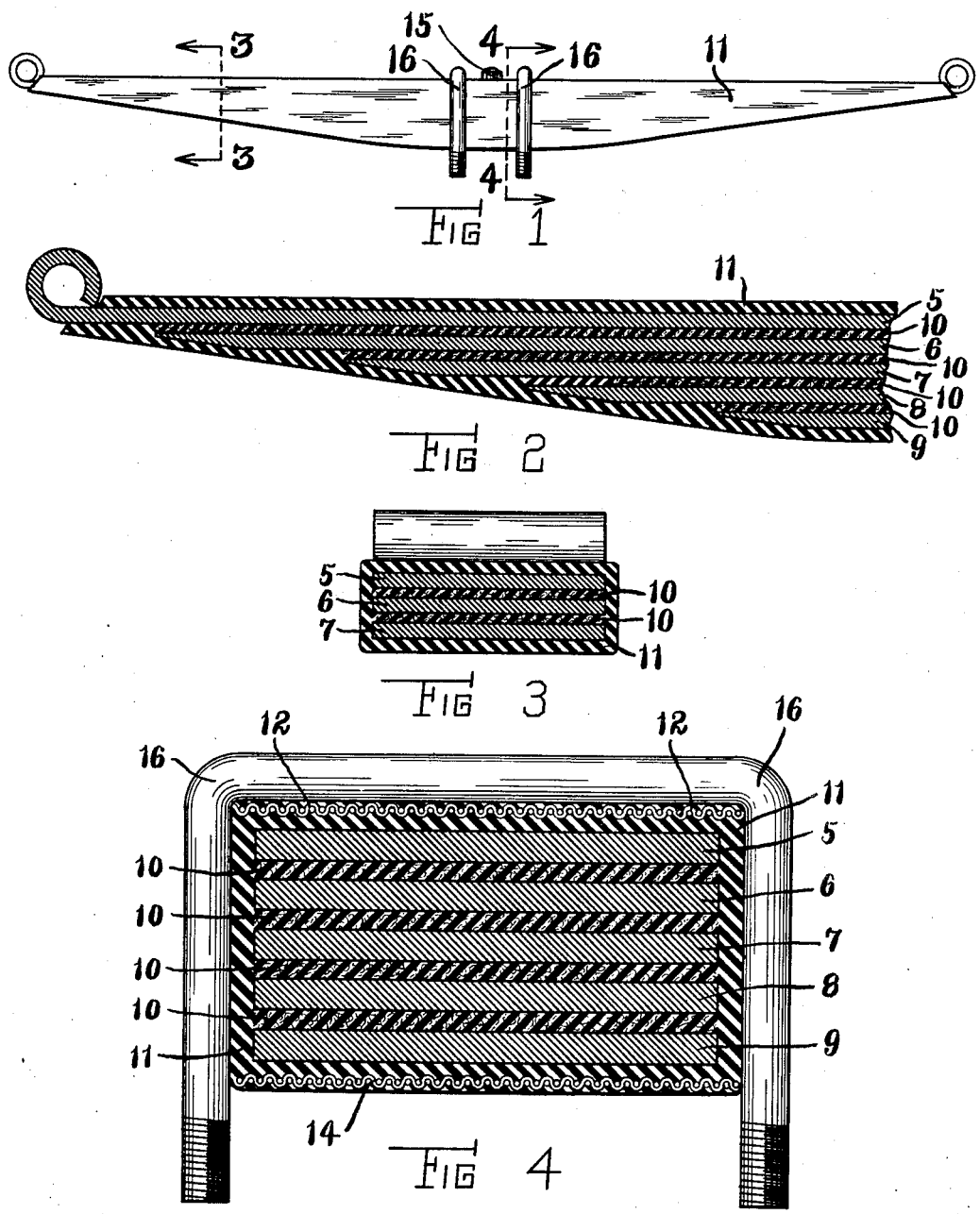

1,990,802

UNITED STATES PATENT OFFICE 1,990,802

VEHICLE SPRING

Tom H. Thompson, Akron, Ohio

Application November 8, 1932, Serial No. 641,693

2 Claims. (Cl. 267—47)

This invention relates to improvements in vehicle springs of the type commonly employed on motor vehicles.

Objects of the invention are to provide a vehicle spring of strong, durable construction, which can be manufactured at a low cost; which will require no oiling or cleaning; which will be very efficient in use and which may be subjected to a long period of hard usage without adjustment or other attention.

In the modern motor vehicle, the event of four wheel brakes, shock absorbers and pneumatic tires of large air capacity has rendered a continued uniform spring action necessary. Springs of ordinary construction are ordinarily lubricated to accelerate spring action and to prevent the spring leaves from becoming "frozen" by rust or corrosion. As the flexibility and action of the spring changes materially with the condition of the lubrication, it is practically impossible to retain a proper brake setting or shock absorber adjustment.

It is therefore a particular object of this invention to provide a spring in which the spring action is frictionally retarded by brake lining or other suitable wear-resisting material between the spring leaves and to completely cover the spring with a permanent sheath of impervious material whereby the spring will be protected from water, oil, grit or other substance and will be uniform in operation during a period of long, continued use.

In the accompanying drawing there is shown an illustrative embodiment of the invention, it being understood that the invention is not confined to the exact form illustrated and that it is subject to changes and modifications which come within the scope of the claims hereunto appended.

In the drawing:—

Figure 1 is a side elevational view of a spring constructed in accordance with the invention herein disclosed, Figure 2 is a vertical, longitudinal, sectional view taken through a portion of a spring, Figure 3 is a cross sectional view of same taken as indicated by the line 3—3 of Figure 1, Figure 4 is a similar view taken through the middle portion of the spring as indicated by the lines 4—4 of Figure 1.

In the particular adaptation of the invention illustrated in the drawing, there are shown spring leaves 5, 6, 7, 8 and 9. The said leaves are separated by the layers 10 of brake lining or other wear resisting material which is adapted to exert a frictional retarding influence against a relative, longitudinal movement of the spring leaves. The layers 10 illustrated in the drawing are formed of a material commonly known as rubber brake lining which is formed of a vulcanizable rubber compound containing asbestos fiber, carbon black vulcanized to form a wear resisting strip, impervious to moisture. The layer 10 may be fully vulcanized before being placed between the leaves 5, 6, 7, 8, and 9, or may be positioned therebetween in an unvulcanized or partly vulcanized condition, and the assembled spring submitted to a vulcanizing heat.

The numeral 11 denotes a layer of rubber, preferably elastic rubber, which completely encloses the main body of the spring and protects the leaves 5, 6, 7, 8 and 9 from oil, moisture, salt, dust or any objectionable element. The layer 11 is preferably placed on the spring in an unvulcanized condition, and vulcanized in place to form a perfect fitting sheath, but it is understood that the invention is broad enough to include a sheath otherwise formed of any suitable material and cemented, vulcanized or otherwise secured on the spring. As the layers 10 are formed of a rubber compound, the sheath 11 is integrally joined to said layers by vulcanization.

Layers 12 and 14 of reinforcing material which may be in the form of cord fabric are employed to reinforce the portions of the sheath 11 which are subjected to pressure by the action of the U-bolts 16 by which the spring is mounted on an axle.

In use, the leaves 5, 6, 7, 8 and 9 will be given a relative longitudinal movement by flexing the spring. This movement is somewhat retarded by frictional contact with the layers 10. The sheath 11 being vulcanized to the layers 10 will yield sufficiently to permit a full operative movement of the spring leaves. As the spring leaves are completely protected by the sheath 11, the action of the spring will be uniform throughout the period of use to which it is subjected.

The invention having thus been fully described and illustrated, what I claim as new and patentable is:—

1. In a laminated spring for vehicles, a series of superimposed metallic spring leaves, members interposed between the spring leaves formed of a material to prevent the decrease of the friction between the members and the leaves as the degree of polish of the contacting surfaces of said members and said leaves is increased due to wear, such material comprising a rubber composition including carbon black forming a wear resisting strip impervious to moisture.

2. In a laminated spring, a series of metallic spring leaves, members interposed between the metallic spring leaves and having their surfaces in frictional sliding contact with the surfaces of said leaves, said members acting to increase the friction between the contacting surfaces thereof and the spring leaves in direct ratio to the increase of polish of the contacting surfaces due to wear, said members being composed of a vulcanizable rubber compound including asbestos fiber to retain the frictional qualities of the members substantially constant, regardless of changes in temperature, and carbon black to retain the frictional qualities of the members, regardless of degree of surface polish, said material being vulcanized to form a wear resisting friction strip impervious to moisture, said strips being interposed between the spring leaves to retard the longitudinal movement of the metallic leaves through frictional engagement with the surfaces of said members with the surface of said leaves accompanied by substantially no distortion of the material.

TOM H. THOMPSON.